(12) United States Patent
Song-Bodenstab et al.

(10) Patent No.: US 6,541,056 B1
(45) Date of Patent: Apr. 1, 2003

(54) MALTED BEVERAGE POWDER AND PROCESS

(75) Inventors: Xiaomei Song-Bodenstab, Mannens (CH); Paul Eichler, Chavornay (CH)

(73) Assignee: Nestec S.A., Vevey (CH)

( * ) Notice: Subject to any disclaimer, the term of this patent is extended or adjusted under 35 U.S.C. 154(b) by 107 days.

(21) Appl. No.: 09/609,835

(22) Filed: Jul. 5, 2000

(30) Foreign Application Priority Data

Jul. 10, 1999 (EP) .............................. 99113385

(51) Int. Cl.[7] .......................... A23L 1/185; A23L 2/52; A23P 1/06
(52) U.S. Cl. .................. 426/453; 426/454; 426/455; 426/456; 426/464; 426/519; 426/588; 426/590
(58) Field of Search ................................ 426/590, 588, 426/453, 454, 455, 456, 464, 519, 580, 593

(56) References Cited

U.S. PATENT DOCUMENTS 4,619,833 A    10/1986    Anderson

FOREIGN PATENT DOCUMENTS

| EP | 0 920 814 | 6/1999 |
|----|-----------|--------|
| GB | 928 206 | 6/1963 |
| WO | WO 93 07769 | 4/1993 |

*Primary Examiner*—Helen Pratt
(74) *Attorney, Agent, or Firm*—Winston & Strawn

(57) ABSTRACT

The present invention relates to a malted beverage powder and a process for preparing it. In the process of the present invention, liquid beverage ingredients and a first portion of dry malted beverage ingredients are wet mixed to provide a wet mixture having a moisture content of about 20% or less. The wet mixture is vacuum dried to provide a dry cake which is comminuted to a base powder. The base powder is then dry mixed with a further portion of dry malted beverage ingredients. The malted beverage powder so obtained has a substantially homogeneous color and characteristics such as flavor and texture similar to those of conventionally-prepared malted beverage powder.

26 Claims, No Drawings

MALTED BEVERAGE POWDER AND PROCESS

FIELD OF THE INVENTION

This invention is directed to a beverage powder and process for making it. More specifically, the present invention relates to malted beverage powder and process for manufacturing such beverage powder.

BACKGROUND OF THE INVENTION

Malted beverage powders are well known. For example, malted beverage powders are commercially available under the trademarks MILO® and NESTOMALT®. These beverage powders are reconstituted by adding hot or cold liquid such as milk or water into the powder. Thus, they should ideally be readily soluble in hot or cold liquids.

Malted beverage powders are usually prepared by mixing malt extracts or concentrates with various dry ingredients such as a protein source in the form of milk powder, egg proteins, or soya concentrates; sugars; flavoring agents such as cocoa; carbohydrate such as modified or hydrolysed cereals; and vitamins, minerals, fats, oils, water and the like. Typically, water is added to reduce the viscosity of the mixture. The mixture is dried, usually by vacuum drying, and then comminuted to powder. The main disadvantage of this conventional process is that considerable amounts of water need to be added during mixing. This means substantial amounts of water also have to be removed during the drying step. This significantly increases the cost of manufacturing beverage powders.

One attempt at providing a process with reduced energy consumption is described in the PCT patent application WO 93/07769. In this patent application, a cereal containing less than 40% by weight moisture is cooked in an extruder under severe conditions. The severe conditions were considered necessary to solubilize α-glucans in the cereal so that the ultimate product is sufficiently soluble in water. The extrudate leaving the extruder has a moisture content of about 5 to 8% by weight which may then be further dried to desired levels. Consequently, a maximum of only about 5% moisture needs to be removed which represents a considerable economic savings over the conventional processes described above.

A disadvantage of the process described in above patent application is that it is quite difficult to achieve a flavor profile and texture identical or comparable to those of beverage powders obtained using conventional processes. This is tacitly acknowledged in the PCT patent application in which it mentions that the products have "new and interesting flavours". Many consumers immediately notice and usually react unfavorably toward an altered, particularly if unexpected, flavor or texture of a beverage powder. Thus, while it is useful to be able to provide new flavors and textures, there is a need for an energy-saving process that also allows the manufacture of a product that has a flavor and texture that closely mimics those of a conventionally prepared product. The present invention provides such process as well as a product produced by such process.

SUMMARY OF THE INVENTION

The present invention resolves the problems of the prior art by providing a process that has a reduced energy requirement and that gives rise to a product having characteristics comparable to those which are made by a conventional process. The process comprises wet mixing liquid beverage ingredients and a first portion of dry malted beverage ingredient to provide a wet mixture having a moisture content of about 20% or less, vacuum drying the wet mixture to provide a dry cake, comminuting the dry cake to a base powder, and dry mixing the base powder with a Second portion of dry malted beverage ingredients to yield a malted beverage powder. Preferably, the second portion of the dry malted beverage ingredients comprises powdered whole or skimmed milk and powdered cocoa solids.

Surprisingly, the process produces a malted beverage powder that has a taste profile closely resembling that of conventional beverage powders. Also, the process is able to produce beverage powders having an appearance, texture and density similar to those of conventional beverage powders. Further, the process allows a lower drying requirement per unit weight of the product, thereby increasing production capacity and reducing energy consumption.

The present invention also provides a malted beverage powder which comprises: a base powder of substantially homogeneous particles comprising malt, milk solids, sugar, and cocoa and/or other carbohydrates powder; and a supplementary powder in the form of a dry mixture comprising milk powder, cocoa powder and/or other carbohydrate powder. The malted beverage powder possesses a substantially homogeneous color.

A homogeneous brown color is obtained if the malt beverage powder contains cocoa. Without cocoa, the malt beverage powder acquires a homogeneous color ranging from beige to golden yellow.

DETAILED DESCRIPTION OF THE PREFERRED EMBODIMENTS

Both dry and liquid ingredients are required to produce the malted beverage powder of the present invention. The dry beverage ingredients may be varied according to local tastes and recipes. Generally, the dry beverage ingredients comprise one or more powdered protein source such as milk powder, skim milk powder, egg protein powder, vegetable or grain protein isolates such as soya protein isolates; artificial or natural sweeteners such as sucrose, fructose, or glucose; malt powders; hydrolysed cereal powders; starch powders; other carbohydrate powders; vitamins and minerals; cocoa powders; and powdered flavoring agents. The exact amount of each dry beverage ingredient may vary widely depending on the specific recipe used. Some of the ingredients may be omitted entirely.

The liquid beverage ingredients may also be chosen based on local tastes and preferences. Generally, these liquid beverage ingredients include one or more of fats and oils such as vegetable fats including palm oils and palm fats, and animal fats such as butter fats. The liquid beverage ingredients also preferably include liquid malt extracts, liquid sweeteners such as honey and glucose syrup, liquid protein sources such as vegetable protein concentrates, and the like. As with the dry beverage ingredients, the exact amount of each liquid beverage ingredient may also vary widely according to local recipes and some of the liquid beverage ingredients may be omitted entirely.

The make up and specifications of the above ingredients are not critical to the process of the present invention. If a malted beverage powder is already produced by a conventional process, it is preferable to use in the process of the present invention as many ingredients as are used in the former. This makes it easier to achieve the same flavor profile, if desired.

The liquid beverage ingredients and a portion of the dry beverage ingredients are fed into a wet mixer in which the liquid and dry ingredients are thoroughly and homogeneously mixed. The wet mixer may be any suitable mixer for mixing ingredients having a low moisture content, for example, below about 20% by weight. Suitable mixers include ribbon blenders, continuous mixers and extruders. The mixture comprising the liquid beverage ingredients and dry beverage ingredients preferably has a solids content of at least about 80% by weight, more preferably between about 85% to about 90% by weight. Although most of the dry ingredients contain small amounts of moisture, the primary source of moisture in the mixture of the present invention is liquid malt extract and water. Most commercial liquid malt extracts contain between 15 to 30% water by weight. Water is normally added to the wet mixer to reduce the viscosity of the mix to a pumpable level.

The mixture is then transferred to a suitable vacuum drier which is able to handle extremely viscous mixtures. Vacuum band driers are particularly preferred. Conventional vacuum band driers are particularly suitable. Using a vacuum drier, the mixture is dried to a cake. Typical vacuum drying conditions may be used, for example, temperatures ranging from about 120° C. to about 160° C. and pressures ranging from about 0 bar to about 100 mbar, preferably from about 20 mbar to about 50 mbar. The cake which is about to leave the vacuum drier may be cooled before leaving the drier. Alternatively it may be cooled after leaving the drier.

The cake is then comminuted using one or more crushers or mills as necessary. The base powder obtained preferably comprises less than about 4% by weight of moisture and preferably has a density of about 500 grams/liter to about 700 grams/liter.

A second portion of the dry beverage ingredients is then mixed with the base powder to provide the malted beverage powder. The second portion is preferably made up of a mixture of powdered milk (skimmed or whole) and powdered cocoa solids. Before mixing with the base powder, the second portion of dry malt beverage ingredients are preferably heated to remove unwanted aroma and sprayed with mediates such as water or oil and emulsifier in an amount sufficient to produce the desired color. Advantageously, before being mixed with the base powder, the second portion of dry malt beverage ingredients are prepared by heating between about 40° C. to 80° C. for about 5 minutes to about 30 minutes and sprayed with mediates such as water or oil and emulsifier. Preferably, the mediates represent up to about 4% by weight and typically between about 0.1 and 4% by weight of the second portion of dry malt beverage ingredients. The base powder preferably comprises about 70% to about 90% by weight of the malted beverage powder.

The first portion of the dry beverage ingredients may make up about 20% to about 70% by weight of the dry weight of all ingredients. Preferably, the first portion of the dry beverage ingredients makes up about 35% to about 50% by weight of the dry weight of all ingredients. The second portion of the dry beverage ingredients makes up about 10% to about 30% by weight of the dry weight of all ingredients. Preferably, the second portion of the dry beverage ingredients makes up about 15% to about 25% by weight of the dry weight of all ingredients. Preferably the weight ratio of milk powder to cocoa powder in the second portion is about 1:0 to about 0:1, more preferably about 1:0.6 to about 1:1.

The malted beverage powder preferably comprises less than about 4% by weight of moisture, for example, about 2% to about 3% by weight. The malted beverage powder preferably has a density of about 500 grams/liter to about 700 grams/liter. For malted beverage powders containing cocoa, the malted beverage powder preferably has a substantially homogeneous brown color despite the presence of the milk powder. The particle size of the malted beverage powder is preferably less than about 2 mm although the size distribution may be wide. The malted beverage powder may then be filled using various types of containers and packages such as aluminum pouches or cans.

The malted beverage powder prepared according to the process of the present invention has a flavor profile and texture that are quite similar to those of conventionally prepared malted beverage powders. Preferably, the malted beverage powder of the present invention also has an appearance or density that are comparable to those of conventionally produced malted beverage powders. By "similar" or "comparable", it is meant that the characteristics of the malted beverage powder of the present invention are such that its dominant flavor profile or texture, for example, corresponds to that of a conventionally prepared malted beverage powder. The use of both terms is also intended to encompass situations wherein the characteristics of the product of the present invention are substantially identical or indistinguishable from those of conventionally prepared malted beverage powders.

EXAMPLES

The following examples illustrate the preferred embodiments of the invention.

Example 1

Malt extract, skimmed milk powder, cocoa, sugar, fats, minerals and vitamins are mixed in a ribbon blender with water to provide a wet mixture. The first mixture has a solids content of about 87% by weight. The composition of the first mixture is given in Table 1 below.

TABLE 1

| COMPONENT | % BY WEIGHT* |
| --- | --- |
| Malt extract | 35% |
| skimmed milk powder | 12% |
| Cocoa | 5% |
| Sugar | 19% |

TABLE 1-continued

| COMPONENT | % BY WEIGHT* |
|---|---|
| Fats | 8.6% |
| Minerals and vitamins | 0.9% |
| Total | 80.5% |

*Based on the dry weight of the final product.

The wet mixture is transferred to a vacuum band drier which is operated at 140° C. and 35 mbar. The vacuum band drier includes a cooling stage operated at 30° C. The residence time in the vacuum belt drier is about 25 minutes. The cake leaving the vacuum belt drier has a moisture content of about 2% to about 2.2%.

The cake is crushed and milled to provide a base powder. The base powder preferably has a density of about 500 grams/liter and a size of less than about 2 mm with a broad size distribution.

A dry mix of skimmed milk powder and cocoa is then combined with the base powder to provide the final powder. The dry mix provides 19.5% by weight of the final powder and is made up of 10% by weight of milk powder, 7% by weight of cocoa solids, and 2.5% by weight of water, the percentages being on the basis of the dry weight of the final powder. The dry mix is prepared by spraying water in an amount of 3% by weight of the dry mix, followed with 30 minutes of heating at 60° C. to remove some of the unwanted aroma. The final powder has a substantially homogeneous brown color and a density of about 520 grams/liter.

Example 2

Malt extract, skimmed milk powder, cocoa, sugar, fats, minerals and vitamins are mixed in a ribbon blender with water to provide a wet mixture. The first mixture has a solids content of about 87% by weight. The composition of the first mixture is given in Table 2 below.

TABLE 2

| Component | % Weight* |
|---|---|
| Malt extract | 31% |
| Skimmed milk powder | 11% |
| Cocoa | 9% |
| Sugar | 22% |
| Fats | 9% |
| Minerals and Vitamins | 1% |
| Total | 83% |

*Based on the dry weight of the final product.

The wet mixture is transferred to a vacuum band drier which is operated at about 140° C. at about 35 mbar. The vacuum band drier includes a cooling stage operated at about 30° C. The residence time in the vacuum belt drier is about 25 minutes. The cake leaving the vacuum belt drier has a moisture content of about 2.2% to about 2.5%.

The cake is crushed and milled to provide a base powder which has a density of about 500 grams/liter and a size of less than about 2 mm with a broad size distribution.

A dry mix of skimmed milk powder and cocoa is then combined with the base powder to provide the final powder. The dry mix provides 15.5% by weight of the final powder. It is made up of 65% by weight of milk powder solid, 32% by weight of cocoa solid and 3% by weight water. The dry mix is prepared by spraying 3% water by weight of the dry mix, followed with 30 minutes of heating at 60° C. to remove some of the water and unwanted aroma.

The final powder has a substantially homogeneous brown color and a density of about 520 grams/liter.

Example 3

The properties of the beverage powder of example 1 or 2 are compared with those of a conventionally prepared powder which is used as a reference powder. The powders have substantially the same density, color, and overall appearance.

When the powder of the present invention and the reference powder are placed in hot water or milk at 80° C. they show similar wetting and dissolution characteristics. Further, the organoleptic properties of the beverages obtained from both powders are largely indistinguishable from each other.

Numerous modifications may be made to the embodiments and examples described herein without deviating from the scope of the invention. Thus, the various embodiments and examples described herein should not be construed as limiting the invention in any manner.

What is claimed is:

1. A process for producing a malted beverage powder comprising:

wet mixing liquid beverage ingredients and a first portion of dry malted beverage ingredients to provide a wet mixture having a moisture content of about 20% or less;

vacuum drying the wet mixture to provide a dry cake;

comminuting the dry cake to a base powder; and dry mixing the base powder with a second portion of dry malted beverage ingredients to yield the malted beverage powder.

2. The process according to claim 1, wherein the resulting malted beverage powder has one or more of a flavor profile, texture, appearance, or density similar to those of a conventional malted beverage powder.

3. The process according to claim 1, further comprising heating the second portion of dry malt beverage ingredients and spraying with at least one mediate before dry mixing with the base powder.

4. The process according to claim 3, wherein heating is performed between about 40° C. to about 80° C.

5. The process according to claim 3, wherein the mediate comprises at least one emulsifier and at least one of an oil or water.

6. The process according to claim 3, wherein the second portion of the dry malt beverage ingredients comprises up to about 4% by weight of mediates.

7. The process according to claim 1, wherein vacuum drying is performed at pressures ranging from about 0 mbar to about 100 mbar.

8. The process according to claim 1, wherein vacuum drying is performed at temperatures ranging from about 120° C. to about 160° C.

9. The process according to claim 1, wherein the liquid beverage ingredients comprise one or more fats, oils, protein source, carbohydrate source, or malt extracts.

10. The process according to claim 1, wherein the dry malted beverage ingredients comprise at least one protein source, carbohydrate source, or malt powder.

11. The process according to claim 1, wherein the dry malted beverage ingredients comprise milk powder, cereal powder, starch powder, or cocoa powder.

12. The process according to claim 1, wherein the wet mixture comprises solids in an amount of between about 85% to about 90% by weight.

13. The process according to claim 1, wherein the malted beverage powder comprises vitamins, minerals, sweetener, or flavoring agent.

14. The process according to claim 1, wherein the malted beverage powder comprises an amount of from about 20% to about 70% of the first portion of the dry ingredients.

15. The process according to claim 1, wherein the malted beverage powder comprises all amount of from about 35% to about 50% of the first portion of the dry ingredients.

16. The process according to claim 1, wherein the second portion of the dry beverage ingredients represents about 10% to about 30% of the dry weight of all ingredients.

17. The process according to claim 1, wherein the second portion of the dry beverage ingredients represents about 15% to about 25% of the dry weight of all ingredients.

18. The process according to claim 1, wherein the wet mixture comprises a moisture content of about 10% to about 20% by weight.

19. The process according to claim 1, wherein the base powder comprises less than about 4% moisture by weight and has a density of from about 500 grams/liter to about 700 grams/liter.

20. A malted beverage powder which comprises:

a base powder of substantially homogeneous particles comprising malt, milk solids, sugar, and cocoa or powdered carbohydrates; and a supplementary powder in the form of a dry mixture comprising milk powder and cocoa powder or powdered carbohydrates;

wherein the size of the particles is less than about 2 mm and the size distribution is broad.

21. The malted beverage powder of claim 20 wherein the base powder further comprises vitamins, minerals, a sweetener or a flavoring agent.

22. The malted beverage powder of claim 20, wherein at least one or both of the base powder and supplementary powder includes cocoa.

23. The malted beverage powder of claim 20 that contains less than about 4% moisture by weight.

24. The malted beverage powder of claim 20 wherein the base powder is present in an amount of about 70 to 90% by weight.

25. The malted beverage powder of claim 20 wherein the milk powder and cocoa powder are present in a weight ratio of about 1:0 to 0:1.

26. The malted beverage powder of claim 25 where both milk powder and cocoa powder are present at a weight ratio of between 1:06 to 1:1.

* * * * *

UNITED STATES PATENT AND TRADEMARK OFFICE
CERTIFICATE OF CORRECTION

PATENT NO.    : 6,541,056 B1　　　　　　　　　　　　　　　　　　　　　　　Page 1 of 1
DATED         : April 1, 2003
INVENTOR(S)   : Song-Bodenstab et al.

It is certified that error appears in the above-identified patent and that said Letters Patent is hereby corrected as shown below:

<u>Column 7,</u>
Line 17, change "all" to -- an --.

Signed and Sealed this

Sixth Day of May, 2003

JAMES E. ROGAN
*Director of the United States Patent and Trademark Office*